(12) United States Patent
DeLuca et al.

(10) Patent No.: US 10,275,838 B2
(45) Date of Patent: *Apr. 30, 2019

(54) MAPPING SOCIAL MEDIA SENTIMENTS

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/175,177

(22) Filed: Jun. 7, 2016

(65) Prior Publication Data

US 2017/0352069 A1    Dec. 7, 2017

(51) Int. Cl.
*G06K 9/62* (2006.01)
*G06F 17/27* (2006.01)
(Continued)

(52) U.S. Cl.
CPC ......... *G06Q 50/01* (2013.01); *G06F 17/2785* (2013.01); *G06K 9/6254* (2013.01); *G06Q 30/0282* (2013.01); *H04L 67/306* (2013.01)

(58) Field of Classification Search
CPC ... G06Q 50/01; G06K 9/6254; G06F 17/2785
(Continued)

(56) References Cited

U.S. PATENT DOCUMENTS 8,918,468 B1 * 12/2014 Fisher ................. H04M 3/5191
                                                         705/319
9,269,112 B1 *  2/2016 Manimaran ............ H04L 67/18
(Continued)

OTHER PUBLICATIONS

Damian Borth. Visual Learning of Semantic Concepts in Social Multimedia. springer.com. Sep. 24, 2014. [Retrieved on: Apr. 5, 2018]. Retrieved from internet: <URL:https://link.springer.com/content/pdf/10.1007%2Fs13218-014-0328-x.pdf>. entire document (Year: 2014).*

(Continued)

*Primary Examiner* — Tamara Griffin
(74) *Attorney, Agent, or Firm* — Steven I. Fisher-Stawinski; Arron N. Pontikos

(57) ABSTRACT

A computer-implemented method includes accessing social media data, wherein the social media data is associated with one or more profiles and corresponds to a venue. The computer-implemented method further includes determining sentiment information corresponding to each of the one or more profiles based on the social media data. The computer-implemented method further includes, for each of the one or more profiles: identifying a path through the venue, wherein the path represents at least one movement associated with the profile and associating the sentiment information with the path through the venue. The computer-implemented method further includes, responsive to associating the sentiment information with the path through the venue for each of the one or more profiles, identifying one or more trends. The computer-implemented method further includes presenting the one or more trends for review. A corresponding computer system and computer program product are also disclosed.

6 Claims, 4 Drawing Sheets

(51) Int. Cl.
  *G06Q 30/02* (2012.01)
  *H04L 29/08* (2006.01)
  *G06Q 50/00* (2012.01)

(58) Field of Classification Search
  USPC .............................. 382/159; 705/319; 704/9
  See application file for complete search history.

(56) References Cited

U.S. PATENT DOCUMENTS

| | | | |
|---|---|---|---|
| 9,336,268 B1* | 5/2016 | Moudy | G06F 17/30412 |
| 9,449,218 B2 | 9/2016 | Smith et al. | |
| 2010/0275128 A1 | 10/2010 | Ward et al. | |
| 2012/0209786 A1* | 8/2012 | Shah | G06Q 10/10 |
| | | | 705/319 |
| 2013/0243392 A1 | 9/2013 | Vasudevan et al. | |
| 2014/0025620 A1* | 1/2014 | Greenzeiger | G06F 17/30702 |
| | | | 706/47 |
| 2014/0143241 A1 | 5/2014 | Barello et al. | |
| 2014/0280529 A1* | 9/2014 | Davis | H04L 67/22 |
| | | | 709/204 |
| 2015/0025936 A1* | 1/2015 | Garel | G06Q 30/0201 |
| | | | 705/7.29 |
| 2015/0032510 A1* | 1/2015 | Farahat | G06Q 50/01 |
| | | | 705/7.34 |
| 2015/0074020 A1* | 3/2015 | Arpat | G06N 99/005 |
| | | | 706/12 |
| 2015/0341599 A1* | 11/2015 | Carey | H04N 7/181 |
| | | | 348/150 |
| 2016/0055492 A1* | 2/2016 | Fidelman | G06Q 30/0201 |
| | | | 705/7.29 |
| 2016/0080438 A1* | 3/2016 | Liang | G06F 3/04842 |
| | | | 715/753 |
| 2016/0378884 A1 | 12/2016 | Galli Kagamihata et al. | |
| 2017/0352070 A1 | 12/2017 | DeLuca | |

OTHER PUBLICATIONS

Fiorletta, Alicia, "Connecting Social Media and the Store", May 13, 2014, Retail TouchPoints®, 11 pages, printed on Mar. 23, 2016, <http://www.retailtouchpoints.com/features/retail-success-stories/connecting-social-media-and-the-store>.

Garrity, Justin, "How Social Media is Impacting the In-Store Shopping Experience", Apr. 4, 2014, 7 pages, printed on Mar. 23, 2016, <https://www.besttechie.com/how-social-media-is-impacting-the-in-store-shopping-experience/>.

"Analyze Social Sentiment", IBM Analytics, 2 pages, printed on Mar. 21, 2016, <http://www.ibm.com/analytics/in/en/conversations/social-sentiment.html>.

"Social Insight", IBM Analytics, 4 pages, printed on Mar. 21, 2016, <http://www.ibm.com/analytics/us/en/business/social-insight.html>.

DeLuca et al., "Mapping Social Media Sentiments", U.S. Appl. No. 15/678,244, filed Aug. 16, 2017, pp. 1-26.

IBM Appendix P, "List of IBM Patents or Patent Applications to be Treated as Related", Dated Aug. 16, 2017, 2 pages.

Batrinca et al., "Social Media Analytics: A Survey of Techniques, tools and platforms", AI & Soc (2015) 30, Published online Jul. 26, 2014, pp. 89-116.

Lee et al., "Twitter Trending Topic Classification", 2011 11th IEEE International Conference on Data Mining Workshops, © 2011 IEEE, pp. 251-258.

* cited by examiner

US 10,275,838 B2

MAPPING SOCIAL MEDIA SENTIMENTS

BACKGROUND

The present disclosure relates generally to sentiment modeling and in particular to spatial analysis of social media sentiment data.

The advent of social media has led to an explosion of data from various platforms, including blogs, online forums, Facebook®, and Twitter®, as well as other social media channels. As such, social media has become not only a powerful tool for consumers to voice their opinions and concerns, but an equally powerful tool for businesses to gain a better understanding of consumers' likes and dislikes. Moreover, social media data provide businesses with a wealth of free publicity and exposure. On the other hand, when social media turns negative (e.g., bad reviews), the repercussions of such negative exposure can be detrimental to businesses. In an effort to enhance the experience and thereby minimize negative social media, businesses have begun to analyze social media sentiments (i.e., public opinion as to how consumers feel (e.g., happy, mad, angry, sad, frustrated, excited, funny, etc.) to better understand consumer preferences, market trends and brand awareness. For example, if the social sentiment of an individual or group of individuals is negative, a business can address the problem before it grows.

SUMMARY

A computer-implemented method includes accessing social media data, wherein the social media data is associated with one or more profiles and corresponds to a venue. The computer-implemented method further includes determining sentiment information corresponding to each of the one or more profiles based on the social media data. The computer-implemented method further includes, for each of the one or more profiles: identifying a path through the venue, wherein the path represents at least one movement associated with the profile and associating the sentiment information with the path through the venue. The computer-implemented method further includes, responsive to associating the sentiment information with the path through the venue for each of the one or more profiles, identifying one or more trends. The computer-implemented method further includes presenting the one or more trends for review. A corresponding computer system and computer program product are also disclosed.

DETAILED DESCRIPTION

Figure 1:
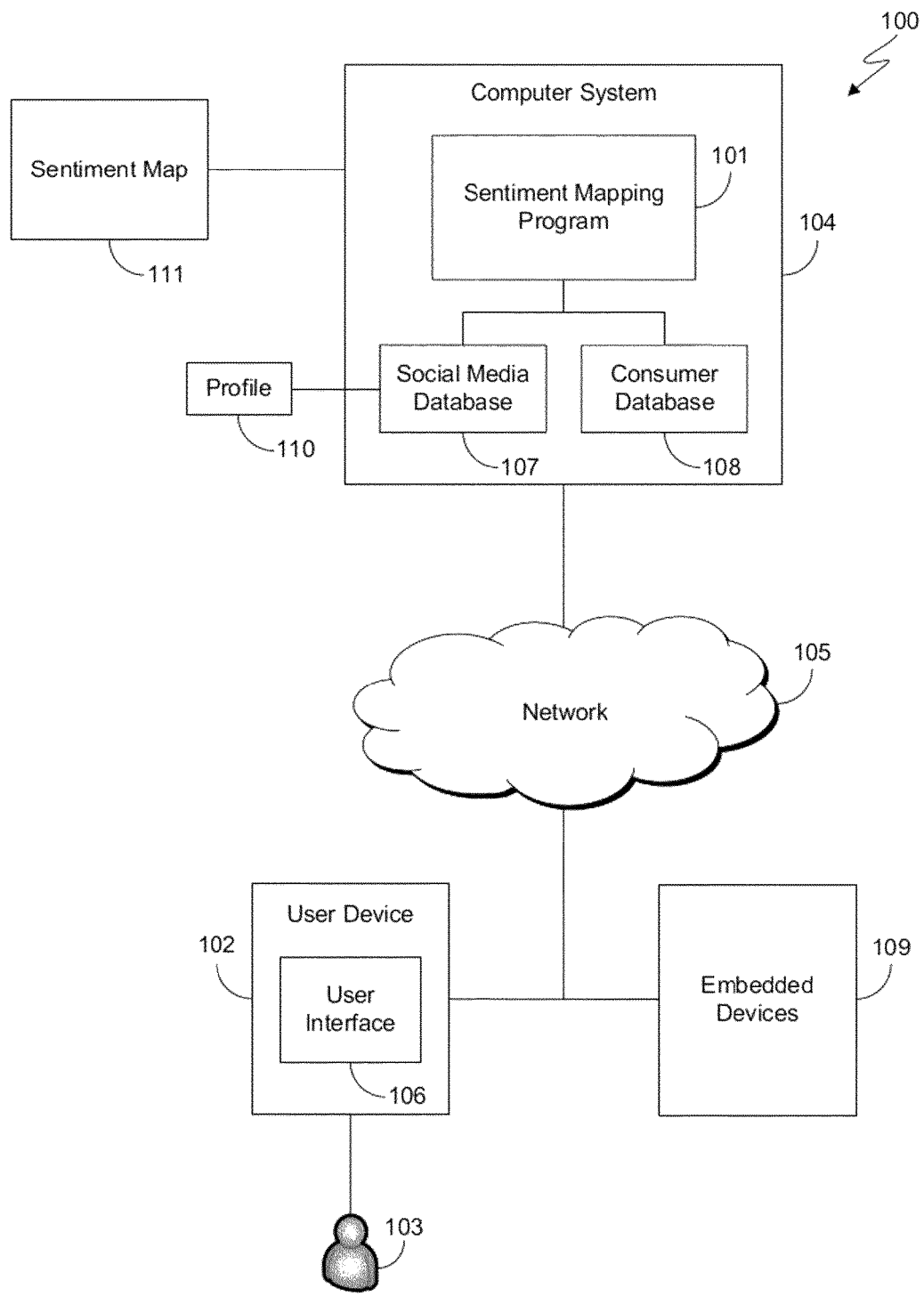
FIG. 1 is a functional block diagram of a distributed data processing environment suitable for operation of a sentiment mapping program in accordance with at least one embodiment of the invention.

Currently, businesses spend a considerable amount of time, money and resources to analyze consumers' sentiments shared through various social media platforms. However, a message, tweet or post by a consumer may only reveal whether a consumer's experience at a venue was either positive or negative, while failing to expose the specific cause or root of the consumer's positive or negative experience. For example, a consumer, while at a venue (e.g., Electronics Store), may post a message: "The customer service at @ Electronics Store was horrible." In another example, a consumer, while at a venue (e.g., Big-Box Store), may post a message: "I love the new layout at #Big-box Store. Everything was so easy to find. I was in and out in no time." Although a business may be able to gather that the first consumer had a negative experience at Electronics Store and the second consumer had a positive experience at Big-box Store, the underlying reason for the consumers' positive or negative experience is not as clear. Was Electronics Store understaffed at the time the consumer was at the venue? What area of Electronics Store did the consumer have a bad experience with customer service? Similarly, which areas of Big-box Store did the second consumer shop in? What was the path of the second consumer at Big-box Store? Various embodiments of the present invention may address or improve upon some or all of the aforementioned problems or disadvantages, however it will be understood that addressing any particular problem or disadvantage is not a necessary requirement for the practice of all embodiments of the present invention.

The inventors have observed and/or recognized that venue operators can improve future consumer experience by analyzing a sentiment map, wherein the sentiment map combines consumer social media data (and more specifically, sentiment information derived from the social media data) with a consumer's path travelled while moving through a venue. The inventors have observed and/or recognized that by analyzing a sentiment map, additional customer support may be added to areas of a venue corresponding to negative sentiments displayed via social media. The inventors have observed and/or recognized that by analyzing a sentiment map, venue operators may reroute consumers to avoid areas corresponding to the posting of negative sentiments. The inventors have observed/and or recognized that by analyzing a sentiment map, venue operators may reroute consumers toward areas corresponding to where consumers posted positive sentiments. Similarly, the inventors have observed and/or recognized that by analyzing a sentiment map, venue operators may redesign a venue layout to reflect paths corresponding to areas where consumers posted positive sentiments. Various embodiments of the present invention may address or improve upon some or all of the aforementioned problems or disadvantages, however it will be understood that addressing any particular problem or disadvantage is not a necessary requirement for the practice of all embodiments of the present invention.

Referring now to various embodiments of the invention in more detail, FIG. 1 is a functional block diagram of a distributed data processing environment, generally designated 100, suitable for operation of a sentiment mapping program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user device 102, user 103 and computer system 104, interconnected over network 105. Network 105 can be, for example, a telecommunications network, a local area network (LAN), a wide area network (WAN), such as the Internet, or a combination of the three, and can include wired, wireless, or fiber optic connections. Network 105 may include one or more wired and/or wireless networks that are capable of receiving and transmitting data, voice, and/or video signals, including multimedia signals that include voice, data, and video information. In general, network 105 may be any combination of connections and protocols that will support communications between user device 102, embedded devices 109, computer system 104, and other computing devices (not shown) within distributed data processing environment 100.

User device 102 may be a laptop computer, tablet computer, smartphone, smartwatch, or any programmable electronic device capable of communicating with various components and devices within distributed data processing environment 100, via network 105. In general, user device 102 represents any programmable electronic device or combination of programmable electronic devices capable of executing machine readable program instructions and communicating with other computing devices (not shown) within distributed data processing environment 100 via a network, such as network 105. User device 102 includes user interface 106.

User interface 106 provides an interface between user 103 of user device 102 and computer system 104. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between user 103 of user device 102 and computer system 104. Mobile application software, or an "app," is a computer program that runs on smartphones, tablet computers, smartwatches and any other mobile devices. User interface 106 enables user 103 to share, exchange, or "post" information, ideas, pictures/videos, emoticons, etc. to various social media platforms (e.g., blogs, online forums, and social networks, such as Facebook® and Twitter®) via network 105. User interface 106 further enables user 103 to provide login credentials to access an "app" associated with a venue on user device 102.

Computer system 104 can be a standalone computing device, a management server, a web server, a mobile computing device, or any other electronic device or computing system capable of receiving, sending, and processing data. In other embodiments, computer system 104 can represent a server computing system utilizing multiple computers as a server system, such as in a cloud computing environment. In an embodiment, computer system 104 represents a computing system utilizing clustered computers and components (e.g., database server computers, application server computers, etc.) that act as a single pool of seamless resources when accessed within distributed data processing environment 100. Computer system 104 includes sentiment mapping program 101, social media database 107 and consumer database 108 communicatively coupled to computer system 104. Although social media database 107 and consumer database 108 are depicted in FIG. 1 as being integrated with computer system 104, in some embodiments, social media database 107 and consumer database 108 may be remotely located from computer system 104. Computer system 104 may include internal and external hardware components, as depicted and described in further detail with respect to FIG. 3.

Social media database 107 and consumer database 108 may be configured to store various information to be accessed and identified by sentiment mapping program 101. Social media database 107 may store social media data associated with a profile and corresponding to a venue. Social media data may include one or more artifacts, such as social media posts, social media messages, posted online reviews, social media comments, as well as metadata associated with the social media data (e.g., time, date, and location of social media data). Social media database 107 may further store sentiment information derived from the social media data. Sentiment mapping program 101 may access social media data transmitted from user device 102 via network 105.

Consumer database 108 may store consumer information about user 103 having user device 102 with an "app" that is associated with a venue. Generally, consumer information may include user's 103 phone number, email address, social security number ("SSN"), financial account information, and physical address. More specifically, consumer information may include information about user's 103 profile 110. Profile 110 may include the name and/or username linked to user 102 device and/or an app associated with a venue, as well as the date and time of the corresponding areas of a path that user 103 traversed. In an embodiment of the invention, sentiment mapping program 101 may identify a path through a venue by accessing location data transmitted from user device 102 itself via network 105. In an embodiment of the invention, sentiment mapping program 101 may identify a path through a venue by accessing location data corresponding to user device 102 from embedded devices 109 via network 105.

Figure 2:
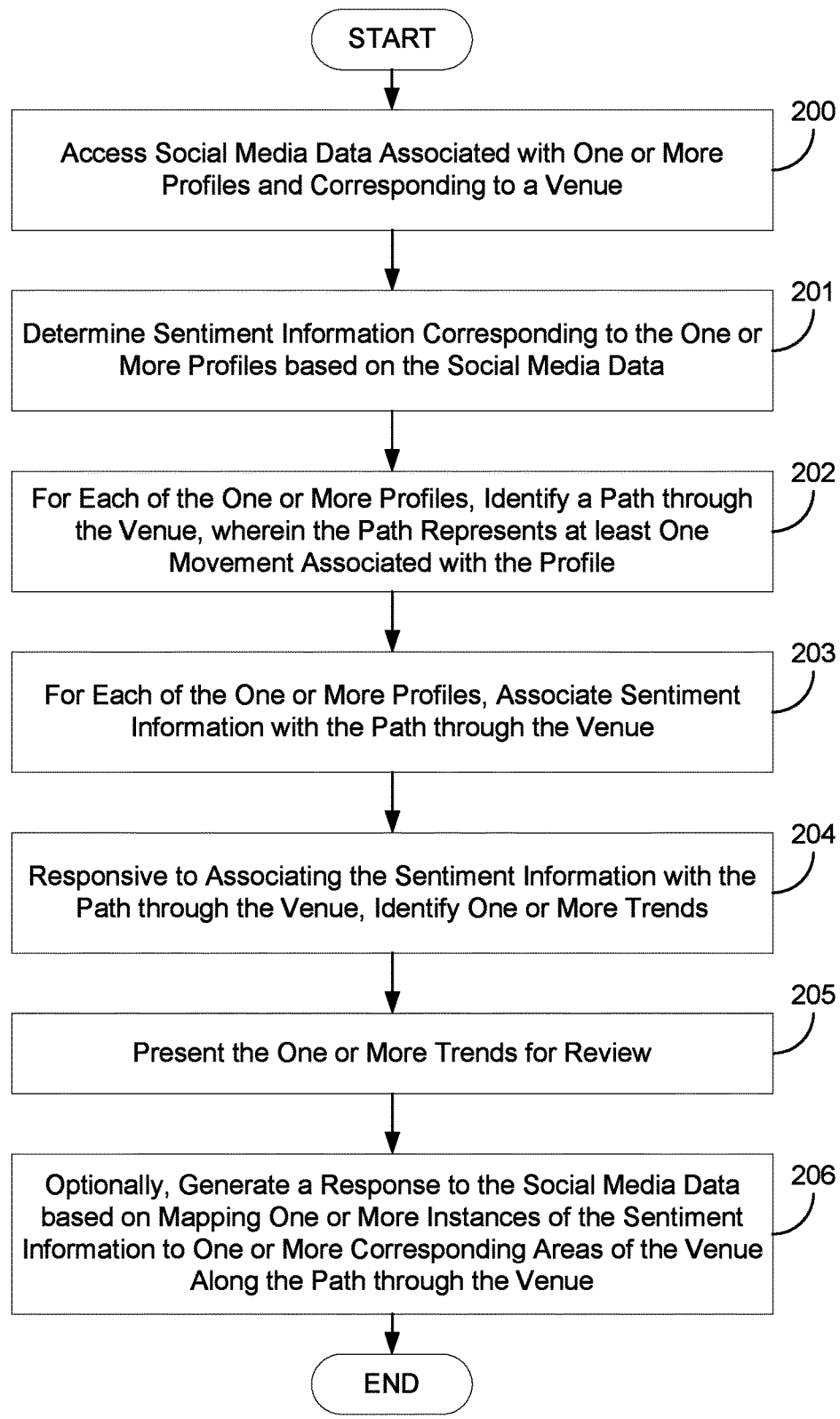
FIG. 2 is a flow chart diagram depicting operational steps for a sentiment mapping program in accordance with at least one embodiment of the invention.

FIG. 2 is a flow chart diagram depicting operational steps for a sentiment mapping program in accordance with at least one embodiment of the invention. At step 200, sentiment mapping program 101 may access social media data associated with one or more profiles 110 and corresponding to a venue. For example, user 103 may be a consumer at a venue. In an embodiment of the invention, sentiment mapping program 101 may access user's 103 social media data upon authorization of user 103. User 103 may further have user device 102, of which user device 102 may include an app associated with the venue. User 103 may authorize the mobile app to allow sentiment mapping program 101 access to social media data associated with profile 110 (e.g., username: "John123") from various social media platforms (e.g., Facebook®, Twitter®, LinkedIn®, Instagram®, etc.). In an embodiment of the invention, social media data may include social media posts, social media messages, posted online reviews, social media reshares, social media likes, social media comments, as well as metadata associated with the social media data. In an embodiment of the invention, social media data may include one or more data artifacts, such as emoticons, images, and videos. In embodiments of the invention, sentiment mapping program 101 may access the social media data transmitted by user device 102 via network 105. For example, user "John123" visits "Electronics Store". While in the checkout line, "John123" posts a sad face emoticon and a message via his smartphone to his Facebook® account: "☹ ☹ ☹ The customer service at #Electronics Store was terrible! They were completely understaffed and I wasted half of my day in there". In embodiments of the invention, social media data may be stored in social media database 107 and accessed by sentiment mapping program 101 at a later time.

Still referring to step 200, sentiment mapping program 101 may determine if the social media data corresponds to the venue (e.g., if the venue is Big-box Store, then sentiment mapping program 101 determines whether a post or other content is applicable to Big-box Store). Here, sentiment mapping program 101 may determine if the social media data corresponds to the venue by searching for social media data that includes the name or a reference to the venue. In an embodiment of the invention, sentiment mapping program 101 may determine if the social media data corresponds to the venue by any generally known text extraction methods, such as natural language processing ("NLP"). For example, sentiment mapping program 101 may extract the words "Big-box" from user's 103 social media data. In an embodiment of the invention, sentiment mapping program 101 may determine if the social media data corresponds to the venue by any generally known approximate string matching methods (i.e., fuzzy string searching), such as edit distance. Here, the closeness of a match between a text string and a pattern is measured in terms of the number of primitive operations necessary to convert the string into an exact match. For example, sentiment mapping program 101 may match the word "Bg-box" to the word "Big-box." In an embodiment of the invention, sentiment mapping program 101 may determine if the social media data corresponds to the venue by identifying any generally known metadata tags, such as a hash tag. A hash tag is a word or phrase generally used to indicate that content falls under a particular topic (e.g., "@Big-box" may be used to indicate user is at Big-box Store or "#Big-box" may be used to indicate user's content relates to Big-box Store). For example, sentiment mapping program 101 may identify the hash tag "@Big-box" from user's 103 social media message "So frustrated with @Big-box right now". In an embodiment of the invention, sentiment mapping program 101 may determine if the social media data corresponds to the venue by any generally known location tags, such as a geotag. A geotag is a string of characters embedded in a message, photograph, website, etc. that refers to a particular geographic region or location. Geotags may be geographic coordinates, location names, or region names and may refer to the location of the social media data, the current location of user 103, or another location relevant to the social media data. For example, sentiment mapping program 101 may identify the location "Big-box" from the coordinates of the geo tag embedded in user's 103 social media post "I'm so excited to get my new television today! geo: −11.234, 55.678".

At step 201, sentiment mapping program 101 may determine sentiment information corresponding to each of the one or more profiles 110 based on the social media data. In an embodiment of the invention, sentiment mapping program 101 may engage in sentiment analysis (i.e., opinion mining). Sentiment analysis aims to determine the attitude of user 103 with respect to a particular topic. The attitude may be user's 103 judgment or evaluation, or user's 103 affective state (i.e., emotional state). Sentiment mapping program 101 may engage in sentiment analysis through the use of any generally known or later discovered and/or improved analytics engines, such as IBM® Watson®. In an embodiment of the invention, sentiment mapping program 101 may employ "NLP" and text analysis (i.e., deriving high-quality information from text through the devising of patterns and trends through means such as statistical pattern learning) to identify and extract subjective information from social media data. For example, sentiment mapping program 101 may classify emotional states, such as "angry," "sad," and "happy."

In an embodiment of the invention, sentiment mapping program 101 may employ a visual sentiment ontology, corresponding image dataset and image analysis (i.e., deriving high-quality information from objects in an image or video sequence through the devising of patterns and trends through machine learning methods). A visual sentiment ontology may be understood as a collection of semantic concepts, wherein each concept is composed of adjective and a noun (e.g., "happy face" or "ugly car"). Each concept may be associated with a collection of images that represent the concept. Furthermore, each concept may be associated with a negative, neutral, or positive sentiment. Using supervised machine learning, such as pattern recognition, the collection of images that represent each concept may be used to train sentiment classifiers. Here, a sentiment classifier may assign each input value (e.g., image, video, or emoticon from social media data) to one of a given set of classes (e.g., negative, neutral, or positive sentiment).

At step 202, for each of the one or more profiles 110, sentiment mapping program 101 may identify a path through a venue, wherein the path represents at least one movement associated with each profile 110. Here, a movement may be understood as the geographic coordinates and/or direction of user device 102 respective to an aisle, area, zone, department, etc. along the path through the venue. Based on the name or username associated with the social media data, sentiment mapping program 101 may match the name or username with profile 110. If a match is detected, sentiment mapping program 101 may identify the path by matching the time and date of the social media data with the time and date user 102 was located in various areas of the venue. Sentiment mapping program 101 may identify a path by any generally known location detection methods. In an embodiment of the invention, sentiment mapping program 101 may determine the path through information transmitted from user's 103 user device 102 to sentiment mapping program 101 via network 105. Here, user device 102 (e.g., mobile phone) may detect its own location (e.g., via a global positioning system ("GPS") and transmit the location data to sentiment mapping program 101.

In an embodiment of the invention, sentiment mapping program 101 may determine a path through information transmitted from a network of embedded devices 109 positioned throughout the venue. More specifically, network of embedded devices 109 may be "nodes" in a wireless sensor network ("WSN"). For example, the WSN may include spatially distributed autonomous sensors that detect the location of user device 102 in the venue. Network of embedded devices 109 may detect the location of user device 102 by any generally known micro-location enabling technologies. Examples of micro-location enabling technologies include, but are not limited to Bluetooth Low Energy ("BLE") based beacons, Ultra-Wideband ("UWB") based radio technology, Wireless Positioning Systems ("WPS"), Magnetic Field Mapping ("MFP"), Radio Frequency Identification ("RFID") (including active RFID), and Near-Field Communication ("NFC"). Sentiment mapping program 101 may communicate with WSN via network 105. Here, sentiment mapping program 101 may identify a path by receiving location data corresponding to user device 102 from the embedded devices 109 by any generally known messaging protocols, including, but not limited to message queuing telemetry transport ("MQTT"), advanced messaging queuing protocol ("AMQP"), internet engineering task force ("IETF") constrained application protocol ("CoAP"), and extensible messaging and presence protocol ("XMPP").

At step 203, for each of the one or more profiles 110, sentiment mapping program 101 may associate the sentiment information with the path through the venue. More specifically, sentiment mapping program 101 may map one or more instances of sentiment information to one or more corresponding areas of the venue along the path through the venue. In an embodiment of the invention, sentiment mapping program 101 may employ a visual sentiment ontology, corresponding image dataset and image analysis to confirm that an individual's facial expressions match the determined sentiment information corresponding to profile 110. For example, sentiment mapping program 101 may receive one or more images of an individual captured by a security camera located within a venue. Based on the images of the individual, sentiment mapping program 101 may determine whether the individual's facial expressions match the determined sentiment information at the time the social media data was generated.

In an embodiment of the invention, sentiment mapping program 101 may generate a sentiment map 111 based on the sentiment information corresponding to profile 110 and the path through the venue which user 103 traversed. Sentiment map 111 may be depicted by any generally known graphical representations, including, but not limited to a chart, drawing, diagram, table, graph, and map. In an embodiment of the invention, sentiment map may be a heat map. A heat map is a graphical representation of data where the individual values included in a matrix are represented as colors. For example, sentiment mapping program 101 may map different types of sentiment information by color (e.g., happy sentiments are denoted by the color red, angry sentiments are denoted by the color blue, neutral sentiments are denoted by the color yellow, etc.).

Figure 3:
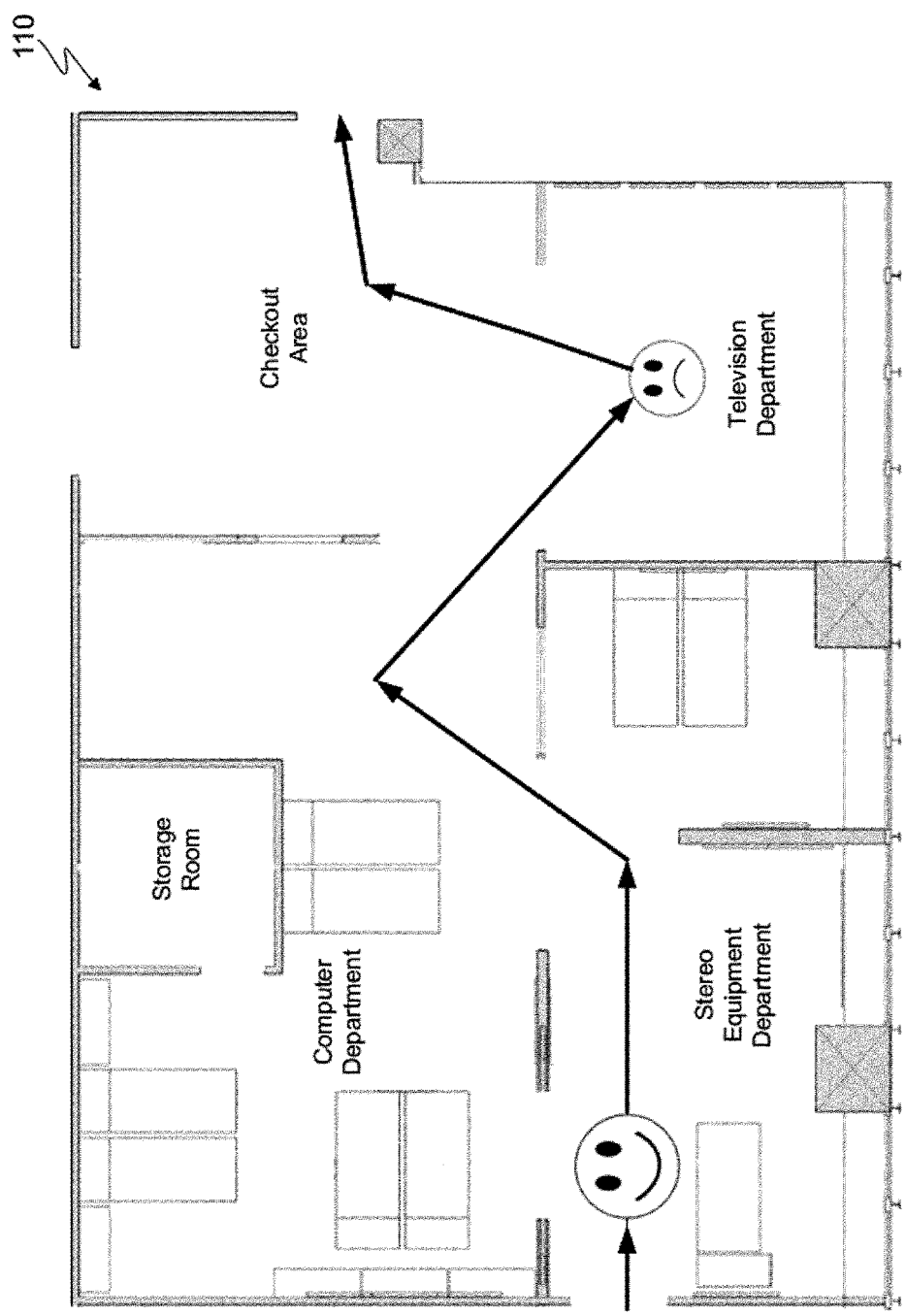
FIG. 3 is an exemplary diagram for a portion of a working example of the sentiment mapping program in accordance with at least one embodiment of the invention.

FIG. 3 is an exemplary diagram for a portion of a working example of the sentiment mapping program in accordance with at least one embodiment of the invention. In FIG. 3, sentiment mapping program 101 has generated sentiment map 111 by mapping instances of sentiment information to corresponding areas of a floor plan of a venue. Furthermore, sentiment mapping program 101 may illustrate the path traversed by user 103 (e.g., line, arrows, etc.). For each instance that the sentiment information corresponds to an area of the venue, sentiment mapping program 101 may indicate the sentiment in the area by an indicator (e.g., words ("positive" or "negative", "happy" or "frustrated"), images (smiley face or frown face), and emoticons, etc.). In an embodiment of the invention, selection of an indicator (e.g., smiley face image, arrows indicating path traversed, etc.) on sentiment map 111 may display additional information about profile 110 and social media data associated with profile 110 stored in social media database 107 and consumer database 108. For example, selection of an indicator on sentiment map 111 may display at least one data object selected from the group consisting of textual information, images, emoticons, overall sentiment score (e.g., changing the color of the path based on a change in sentiment), profile information, social media data, the data of the social media, and the time of the social media data.

Referring now to FIG. 2, at step 204, responsive to associating the sentiment information with the path through the venue for each of the one or more profiles, sentiment mapping program 101 may identify one or more trends. A trend may generally be understood as a general movement over time of a statistically detectable change (e.g., an increase in positive sentiment in an area of a venue). In an embodiment of the invention, a trend may be identified if the number of instances of a particular sentiment (e.g., negative sentiment) mapped to a corresponding area of a venue exceeds a given threshold (e.g., five instances of angry or frustrated sentiments) over a given period of time (e.g., twenty-four hours). For example, sentiment mapping program may identify a "negative" sentiment trend if seven instances of angry or frustrated sentiments are mapped in the television department of Electronics Store over a twelve hour time period. In an embodiment of the invention, sentiment mapping program 101 may employ "NLP" and text analysis to identify and extract subjective information from the social media data to determine a reason for the trend. More specifically, sentiment mapping program 101 may employ the bag-of-words model to determine the frequency of particular words included in the social media data. In the bag-of-words model, text from a sentence or document is represented as the bag of its words, disregarding grammar and word order. For example, sentiment mapping program 101 may determine that the social media data corresponding to five out of the seven negative sentiments mapped included at least one of the following words: "customer", "service, and "employee."

At step 205, sentiment mapping program 101 may present the one or more trends for review. More specifically, sentiment mapping program 101 may generate one or more corrective suggestions corresponding to each of the one or more trends identified. Generating a corrective suggestion may include applying the trend to one or more rules. For example, a rule may be: "If social media data corresponding to a "negative trend" includes the words "customer", "service," or employee," suggest that additional customer support be added to the area of the venue corresponding to the "negative" trend. Additional corrective suggestions may include rerouting consumers to avoid areas of a venue corresponding to "negative" trends and rerouting consumers toward areas of a venue corresponding to "positive" trends. It should be appreciated that sentiment mapping program 101 may generate any number of corrective suggestions corresponding to any number of trends identified.

Optionally, at step 206, sentiment mapping program 101 may generate a response to the social media data based on sentiment map 111. More specifically, the response is generated based on the mapping of the one or more instances of sentiment information to the one or more corresponding areas of the venue along the path through the venue. For example, sentiment mapping program 101 may send user 103 a response in the form of an incentive to remain a consumer of the business (e.g., a coupon for ten percent off their next television purchase) via any communication platform (e.g., mail, email, SMS, social media, etc.) if sentiment map 111 indicates negative sentiment information in the television department of the venue. In another example, sentiment mapping program 101 may send user 103 a response in the form of an apologetic message via any communication platform (e.g., mail, email, SMS, social media, push notification, etc.) if sentiment map 111 indicates negative sentiment information in the checkout line of the venue.

Figure 4:
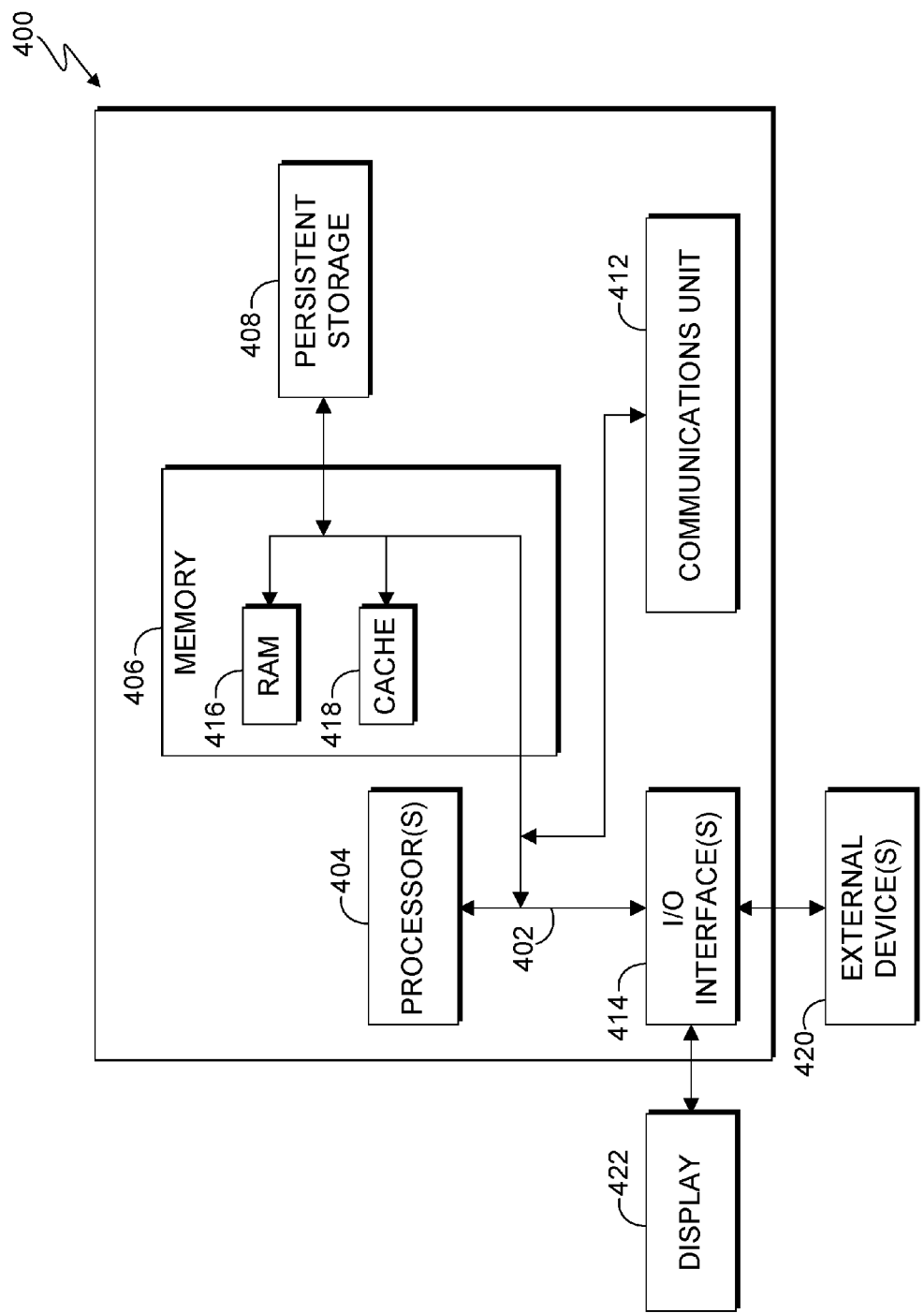
FIG. 4 is a block diagram depicting components of a computer suitable for executing a sentiment mapping program in accordance with at least one embodiment of the invention.

FIG. 4 is a block diagram depicting components of a computer 400 suitable for executing sentiment mapping program 101, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for sentiment mapping program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
accessing social media data, said social media data being associated with a plurality of user profiles and corresponding to a venue;
determining sentiment information corresponding to social media data associated with each of said one or more profiles, wherein said sentiment information is determined based, at least in part, on:
a visual sentiment ontology;
an image data set corresponding to said visual sentiment ontology; and
supervised machine learning;
determining that a facial expression of a user of a mobile device matches said determined sentiment information at the time said user of said mobile device generated said social media data;
for each of said one or more profiles:
identifying a path through said venue, said path representing at least one movement associated with said profile;
associating said sentiment information with said path through said venue, wherein associating said sentiment information with said path through said venue comprises:
mapping one or more instances of said sentiment information to one or more corresponding areas of said venue along said path through said venue; and
generating a sentiment map based on said mapping, wherein said sentiment map displays: (i) social media posts, (ii) social media messages, (iii) posted online reviews associated with said venue, (iv) social media reshares, (v) social media likes, (vi) social media comments, (vii) social media images, (viii) emoticons included in said social media data, (ix) overall sentiment score, (x) user information, (xi) date of said social media data, and (xii) time of said social media data;
responsive to associating said sentiment information with said path through said venue for each of said one or more profiled:
identifying a plurality of trends;
determining a reason for each trend in the plurality of trends based, at least in part, on: (i) natural language processing, (ii) text analysis, and (iii) a bag of words model, wherein the reason for each trend is dependent on a frequency of a group of words included in the social media data;
generating a first alternate route through the venue based, at least in part, on an analysis of the sentiment map, wherein the first alternate route includes a path that avoids a first area of the venue that corresponds to the reason for a negative trend;
generating a second alternate route through the venue based, at least in part, on an analysis of the sentiment map, wherein the second alternate route includes a path to a second area of the venue that corresponds to the reason for a positive trend;

sending, via a notification, the first alternate route to a user of a first mobile device; and sending, via a notification, the second alternate route to a user of a second mobile device.

2. The computer-implemented method of claim 1, further comprising generating a response to said social media data based on mapping said one or more instances of said sentiment information to one or more corresponding areas of said venue along said path through said venue.

3. A computer program product, said computer program product comprising one or more computer readable storage mediums and program instructions stored on said one or more computer readable storage mediums, said program instructions comprising instructions to:

access social media data, said social media data being associated with a plurality of user profiles and corresponding to a venue;

determine sentiment information corresponding to social media data associated with each of said one or more profiles, wherein said sentiment information is determined based, at least in part, on: a visual sentiment ontology; an image data set corresponding to said visual sentiment ontology; and supervised machine learning;

determine that a facial expression of a user of a mobile device matches said determined sentiment information at the time said user of said mobile device generated said social media data;

for each of said one or more profiles: identify a path through said venue, said path representing at least one movement associated with said profile;

associate said sentiment information with said path through said venue, wherein associating said sentiment information with said path through said venue comprises instructions to: map one or more instances of said sentiment information to one or more corresponding areas of said venue along said path through said venue;

and generate a sentiment map based on said mapping, wherein said sentiment map displays: (i) social media posts, (ii) social media messages, (iii) posted online reviews associated with said venue, (iv) social media reshares, (v) social media likes, (vi) social media comments, (vii) social media images, (viii) emoticons included in said social media data, (ix) overall sentiment score, (x) user information, (xi) date of said social media data, and (xii) time of said social media data;

responsive to associating said sentiment information with said path through said venue for each of said one or more profiles identify a plurality of trends;

determine a reason for each trend in the plurality of trends, wherein the reason for each trend is dependent on a frequency of a group of words included in the social media data;

generate a first alternate route through the venue based, at least in part, on an analysis of the sentiment map, wherein the first alternate route includes a path that avoids a first area of the venue that corresponds to the reason for a negative trend;

generate a second alternate route through the venue based, at least in part, on an analysis of the sentiment map, wherein the second alternate route includes a path to a second area of the venue that corresponds to the reason for a positive trend;

send, via a notification, the first alternate route to a user of a first mobile device;

and send, via a notification, the second alternate route to a user of a second mobile device.

4. The computer program product of claim 3, further comprising program instructions to generate a response to said social media data based on mapping said one or more instances of said sentiment information to one or more corresponding areas of said venue along said path through said venue.

5. A computer system, the computer system comprising:
one or more computer processors;
one or more computer readable storage media;
computer program instructions;
said computer program instructions being stored on said one or more computer readable storage media;
said computer program instructions comprising instructions to:
access social media data, said social media data being associated with a plurality of user profiles and corresponding to a venue;
determine sentiment information corresponding to social media data associated with each of said one or more profiles, wherein said sentiment information is determined based, at least in part, on:
a visual sentiment ontology;
an image data set corresponding to said visual sentiment ontology; and
supervised machine learning;
determine that a facial expression of a user of a mobile device matches said determined sentiment information at the time said user of said mobile device generated said social media data;
for each of said one or more profiles:
identify a path through said venue, said path representing at least one movement associated with said profile;
associate said sentiment information with said path through said venue, wherein associating said sentiment information with said path through said venue comprises instructions to:
map one or more instances of said sentiment information to one or more corresponding areas of said venue along said path through said venue; and
generate a sentiment map based on said mapping, wherein said sentiment map displays: (i) social media posts, (ii) social media messages, (iii) posted online reviews associated with said venue, (iv) social media reshares, (v) social media likes, (vi) social media comments, (vii) social media images, (viii) emoticons included in said social media data, (ix) overall sentiment score, (x) user information, (xi) date of said social media data, and (xii) time of said social media data;
responsive to associating said sentiment information with said path through said venue for each of said one or more profiles:
identify a plurality of trends;
determine a reason for each trend in the plurality of trends, wherein the reason for each trend is dependent on a frequency of a group of words included in the social media data;
generate a first alternate route through the venue based, at least in part, on an analysis of the sentiment map, wherein the first alternate route includes a path that avoids a first area of the venue that corresponds to the reason for a negative trend;

generate a second alternate route through the venue based, at least in part, on an analysis of the sentiment map, wherein the second alternate route includes a path to a second area of the venue that corresponds to the reason for a positive trend;

send, via a notification, the first alternate route to a user of a first mobile device; and send, via a notification, the second alternate route to a user of a second mobile device.

6. The computer system of claim 5, further comprising program instructions to generate a response to said social media data based on mapping said one or more instances of said sentiment information to one or more corresponding areas of said venue along said path through said venue.

\* \* \* \* \*